June 20, 1944. J. F. SMILLIE 2,351,884
NAVIGATION INSTRUMENT
Filed Feb. 6, 1943 2 Sheets-Sheet 1
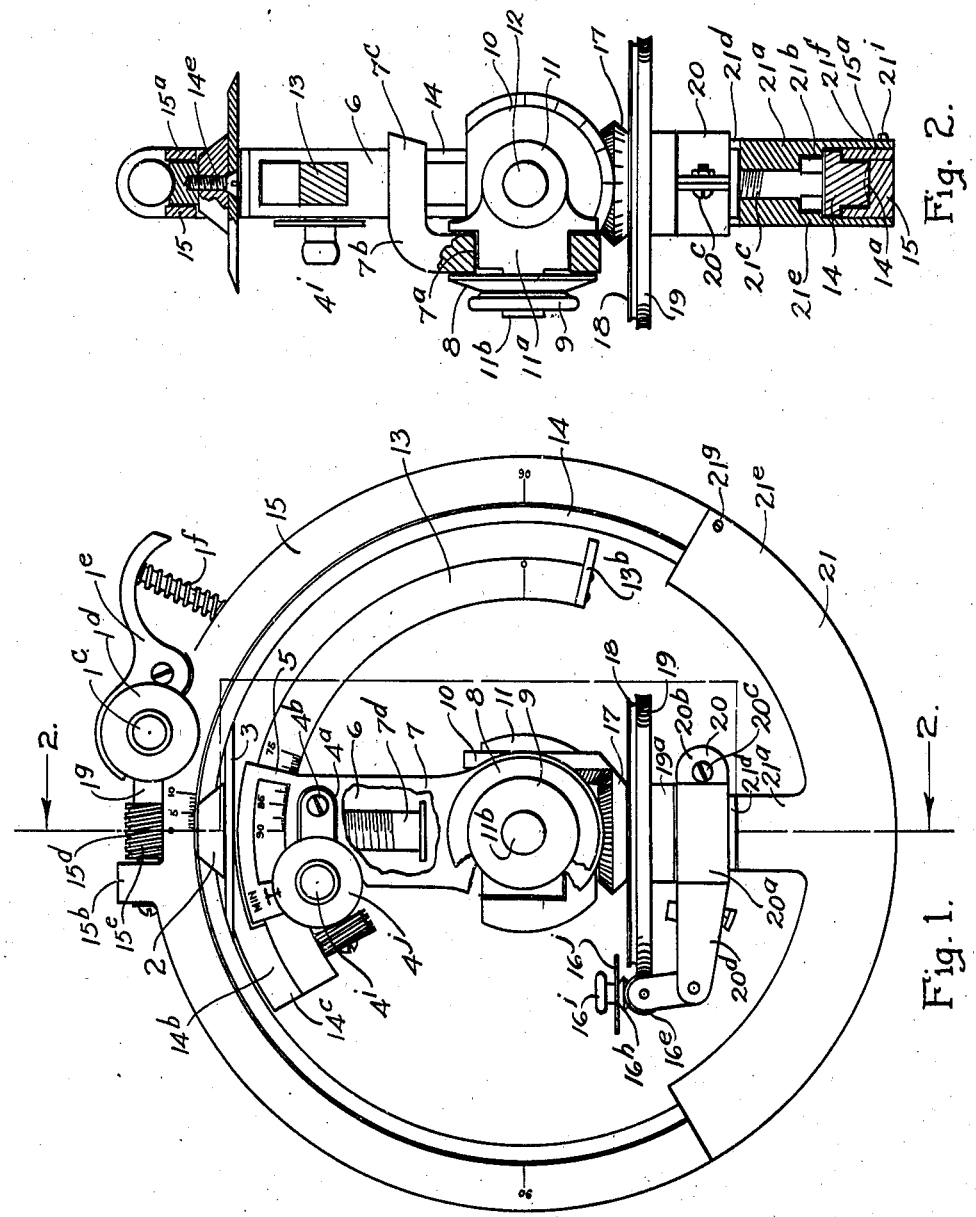
INVENTOR.
JOHN F. SMILLIE
BY
A. B. Bowman
ATTORNEY June 20, 1944.  J. F. SMILLIE  2,351,884
NAVIGATION INSTRUMENT
Filed Feb. 6, 1943    2 Sheets-Sheet 2

INVENTOR.
JOHN F. SMILLIE
BY
A. B. Bowman
ATTORNEY

Patented June 20, 1944

2,351,884

UNITED STATES PATENT OFFICE 2,351,884

NAVIGATION INSTRUMENT

John F. Smillie, San Diego, Calif.

Application February 6, 1943, Serial No. 475,058

18 Claims. (Cl. 33—1)

My invention relates to a navigation instrument, more particularly to instruments for quickly finding the position of ships or the like and the objects of my invention are:

First, to provide a navigation instrument by the use of which the azimuth and altitude of celestial bodies may be obtained simultaneously without reference to the horizon and with the elimination of corrections for dips and for semidiameters;

Second, to provide a navigation instrument of this class which presents graphically the relationship of altitude, azimuth, time, declination, latitude and longitude and thereby solves graphically the spherical triangle;

Third, to provide a navigation instrument of this class which provides for immediate solution for latitude and for longitude from a given altitude, azimuth, declination and Greenwich hour angle and similarly for a given declination and assumed latitude and longitude the azimuth and altitude for any hour angle may be immediately obtained;

Fourth, to provide a navigation instrument of this class which provides a visualization of the heavenly bodies in their relationship, time and position of the observer, thus serving for a ready means for star identification; and Fifth, to provide on the whole a novelly constructed navigation instrument which is durable, efficient, accurate in action, very simple of construction in accordance with its functions, and which will not readily deteriorate or get out of order.

Figure 3:
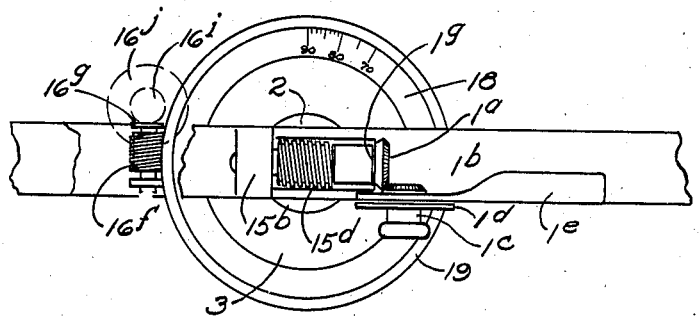
Figure 4:
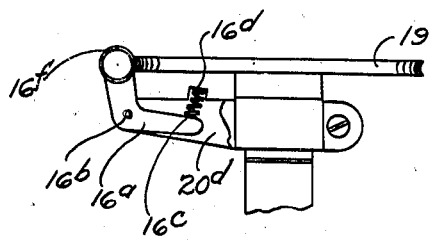

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a front elevational view of my navigation instrument showing portions broken away and in section to facilitate the illustration; Fig. 2 is a sectional view taken on the line 2—2 of Fig. 1; Fig. 3 is a fragmentary top view thereof, Fig. 4 is a side elevational view of a portion of the minute control assembly 16 and Fig. 5 a similar view of the altitude control assembly 4 showing portions broken away and in section to facilitate the illustration.

Similar characters of reference refer to similar parts and portions throughout the several views of the drawings:

The minute control assembly 1, latitude declination arc position indicator 2, azimuth dial 3, altitude control assembly 4, dial window bracket 5, swivel bearing members 6 and 7, friction washer 8, thumb nut 9, hour angle dial actuating gear segment 10, arcuate bracket 11, pole axis pin 12, altitude arc 13, latitude and declination ring 14, stationary minute ring 15, minute control assembly 16, bevel gear 17, hour angle degree dial 18, hour angle worm gear 19, unit assembly supporting clamp 20 and main support 21 constitute the principal parts and portions of my navigation instrument.

The main support 21 is arcuate in form and provided with a central shank portion 21a which extends upwardly some distance and is provided with a recess portion 21b in which is mounted a supporting bolt 21c which extends upwardly above said shank portion some distance and its upper end is screw-threaded into a shank portion 21d. This main support 21 is formed of two arcuate side members 21e and 21f between which is positioned the stationary degree ring member 15 which is L-shaped in cross section and secured to the arcuate portion 21e by means of screws 21g and secured to the inner side of the arcuate portion 21f is a flat ring 15a by means of screws 21i.

Interposed between the members 15 and 15a and between the members 21e and 21f and shiftable relatively thereto is the latitude and declination ring 14 which is substantially T-shaped in cross section. This member 14 is provided with worm teeth 14a in its outer periphery.

Secured around the shank portion 21d which is supported by a bolt 21c at its lower end is the unit assembly supporting clamp 20, which clamp 20 includes an annular portion 20a fitting around the shank portion 21d and is provided with extended lug portions 20b through which is mounted a bolt 20c for clamping the clamp member 20a in position. This clamp member 20 is provided with extended bifurcated lug members 20d between the ends of which is pivotally mounted a bell crank lever member 16a by means of a pin 16b. Positioned against one end of the lever 16a is a tension spring 16c which is supported at its upper end by a cross member 16d, thus tending to hold the extended portion downwardly, all as shown best in Fig. 4 of the drawings.

Revolubly mounted on the upper end of the bell crank lever 16a is a shaft 16e on which is revolubly mounted a worm pinion 16f and adjacent thereto on the shaft 16e is a bevel gear 16g which meshes with another bevel gear 16h which is secured in connection with a finger and thumb wheel 16i on which is mounted a disk 16j which is provided with an index on its upper surface. This worm pinion 16f meshes with a worm gear 19 and this worm gear 19 is revolved through the worm pinions 16f.

The worm gear 19 is provided with a downwardly extending hub portion 19a and it is revolubly mounted on the shank portion 21d. Positioned above this worm gear 19 and revolubly mounted on the shank portion 21d is the hour angle degree dial 18. Mounted above this hour angle degree dial 18 on said shank portion 21d is a bevel gear 17 which meshes with the hour angle dial actuating gear segment 10, as shown best in Fig. 1 of the drawings. This hour angle dial actuating gear segment 10 is mounted on a bracket 11 which is revolubly mounted on the pole axis pin 12, said bracket 11 being supported at its opposite sides on said pin 12. The swivel bearing member 7 is provided with a hole 7a therein in which is revolubly mounted the shank 11a of the bracket 11 and this shank is provided with an extended screw-threaded portion 11b around which is mounted a friction washer 8 which rests against the member 7 and against this friction washer 8 is positioned a thumb nut 9 screw-threaded on the portion 11b and arranged to secure the member 7 rigidly in position with the member 11 and prevent its swivel movement when said nut is tight. This member 7 is provided with a right angle curved portion 7b and with an extended portion 7c in which is mounted a bolt 7d, the upper end of which is screw-threaded in the swivel bearing member 6 which rests upon the upper side of the portion 7c and is revoluble relatively thereto.

Mounted on the swivel member 6 is a bifurcated lug member 4a which is secured to the member 6 by means of screws 4b at opposite sides.

Figure 5:
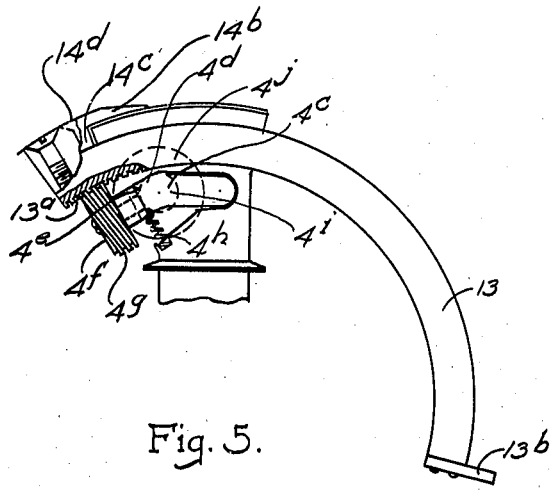

Mounted on the bifurcated lug member 4a and revoluble therewith is a shaft 4c, shown best in Fig. 5, upon which is mounted a bevel gear 4d which meshes with another bevel gear 4e mounted on a shaft 4f and on this shaft 4f is mounted a worm pinion 4g. This worm pinion 4g meshes with a gear rack portion 13a on the inner arcuate side of the altitude arc 13, all as shown best in Fig. 5 of the drawings. The support for the shaft 4f is supported so that the pinion 4g engages the rack 13a by means of a spring 4h tending to hold the pinion in meshed position with the rack 13a. The shaft 4c is turned by means of a thumb and finger wheel 4i in connection with which is a dial member 4j. This altitude arc 13 is provided at one end with a stop member 13b and the member 13 is shiftably mounted in a bracket which is provided with a window opening bracket designated 5, so that the altitude dial on the member 13 may be read through said window opening.

Secured centrally to the latitude and declination ring 14 at its upper side by means of a bolt 14e, Fig. 2, is an arcuate bracket member 14b which is provided with an inwardly extending portion 14c and to this inwardly extending portion 14c is secured the upper end of the altitude arc 13 by means of screws 14d, as shown best in Fig. 5 of the drawings. Thus when the member 14 is shifted, the member 13 is carried along with it.

The stationary degree ring 15 is provided with a lug portion 15b at its upper side which forms a thrust journal for a worm pinion 15d and this worm pinion meshes with the worm teeth 14a, Fig. 2, on the latitude and declination ring 14. This pinion 15d is mounted on a shaft 15e journalled in a lug 1g on a latch member 1e. On the opposite end of said shaft 15e from the pinion 15d is mounted a bevel gear 1a, Fig. 3, which meshes with a bevel gear 1b mounted on the shaft 1c in connection with which is a dial 1d. The assembly is controlled by means of a latch member 1e arranged to disengage the worm 15d from the teeth 14a by depressing said latch. This latch is held in closed position by means of a compression spring 1f interposed between the handle and the main portion of the member 15 on the enlarged member 14 which is threaded to receive a bolt 14e. There is also provided the latitude and declination arc position indicator 2 and also an azimuth dial 3 which is integral with the member 14b.

The operation of my navigation instrument is substantially as follows:

Looking at the instrument from a front view, as shown in Fig. 1, assume the ring 15 to represent the perimeter of the world and the vertical middle of Fig. 1 to represent the position of the equator. A continuation of axis 12, Fig. 2, if viewed from Fig. 1 would terminate through ring 15 as representing the north pole at the left and the south pole at the right.

To find an hour angle or longitude, and given the declination of an observed heavenly body (taken from almanac) and the altitude of above body (from sextant), assuming or known latitude, the following steps are followed: First release assembly 1, 4 and thumb nut 9; second, set the window 5 indicator to 90° minute dial 4 to 0; third, move the ring 14 to the desired degree (north or south) declination by lining indicator 2 with the degree marking on ring 15, engage minute gear 1 and by rotating 1c set minute reading from dial 1d; fourth, tighten thumb nut 9 to hold swivel members 6, 7 and 5 to above position (the center line, of 6 through 5 represents the position of the above observed body).

To set the altitude of a body, the following steps are followed: The altitude of a body is applied by releasing minute gears 1, and 4. Arc 13 can then be rotated through window 5 with ring 14 free to move also. Set the altitude degree on arc 13 by lining up window 5 indicator with markings on 13. Engage the minute gear 4g (Fig. 5) and rotate 4i (Fig. 5) to the desired minute as read from dial 4j (Fig. 5).

To set the latitude, which is read from ring 15, disengage the minute worm gear 16f (Fig. 4) (minute worm gear of the assembly 1 should also be disengaged). By moving the window 5, 6 and 7 transversely from rings 14 and 15, ring 14 will rotate in relation to the assembly 5, 6 and 7 to the length of the altitude arc 13. When assumed or known latitude degree on ring 15 is lined up with indicator line 2 (Fig. 1) engage worm 15d of minute assembly 1 (Fig. 1) and set minute reading by dial 1a (Fig. 1). The movement of assembly 5, 6, and 7 rotated on axis 12 (Fig. 2) actuates bevel gear 10 which actuates gear 17 and being integral with worm gear 19 (Fig. 2) causes the hour angle or longitude dial 18 to move. The hour angle or longitude is then obtained by engaging worm 16f (Fig. 3) by rotating minute dial 16j (Fig. 3) until worm 16f fits snugly in the teeth of the worm gear 19 (Fig. 3) the degree and minute reading can then be taken. This hour angle is added to the hour angle of degree of observed body if in the ascending or subtracted from the hour angle of the degree of observed body if descending.

The azimuth of the observer to the observed is provided by dial 3 which is part of and turns with the assembly 13 (Fig. 1) and read from indicator marked 2 on ring 14.

Though I have shown and described a particular construction, combination and arrangement of parts and portions, and certain modifications thereof, I do not wish to be limited to this particular construction, combination and arrangement, nor to the modification, but desire to include in the scope of my invention, the construction, combination and arrangement substantially as set forth in the appended claims.

Having thus described my invention, what I claim as new and desire to secure by Letters Patent is:

1. In a navigation instrument, the combination of an annular stationary minute ring, a latitude and declination ring revolubly mounted in relation therewith and a minute control assembly mounted on said stationary minute ring and arranged to operatively engage said latitude and declination ring, said minute control assembly arranged to shift into and out of operative position with said latitude and declination ring, an altitude arc pivotally connected to and internally of said latitude and declination ring, a dial window bracket shiftably mounted relatively to said altitude arc, an altitude control assembly in cooperative relation with said altitude arc and said dial window bracket, and a universal shiftable assembly mounted centrally in said stationary minute ring and operatively connected with said dial window bracket.

2. In a navigation instrument, the combination of an annular stationary minute ring, a latitude and declination ring revolubly mounted in relation therewith and a minute control assembly mounted on said stationary minute ring and arranged to operatively engage said latitude and declination ring, said minute control assembly arranged to shift into and out of operative position with said latitude and declination ring, an altitude arc pivotally connected to and internally of said latitude and declination ring, a dial window bracket shiftably mounted relatively to said altitude arc, an altitude control assembly in cooperative relation with said altitude arc and said dial window bracket, a universal shiftable assembly mounted centrally in said stationary minute ring and operatively connected with said dial window bracket, and an hour angle degree dial revolubly connected with said universal operating unit.

3. In a navigation instrument, the combination of an annular stationary minute ring, a latitude and declination ring revolubly mounted in relation therewith and a minute control assembly mounted on said stationary minute ring and arranged to operatively engage said latitude and declination ring, said minute control assembly arranged to shift into and out of operative position with said latitude and declination ring, an altitude arc pivotally connected to and internally of said latitude and declination ring, a dial window bracket shiftably mounted relatively to said altitude arc, an altitude control assembly in cooperative relation with said altitude arc and said dial window bracket, a universal shiftable assembly mounted centrally in said stationary minute ring and operatively connected with said dial window bracket, an hour angle degree dial revolubly connected with said universal operating unit and a minute control assembly in cooperative relation therewith.

4. In a navigation instrument of the class described, the combination of an arcuate main support provided with an intermediate shank member, a stationary minute ring secured to said main support, a minute control assembly positioned on said stationary minute ring on the opposite side from said main support and a latitude and declination ring revolubly mounted in connection with said main support and said stationary minute ring manually operable by said minute control assembly.

5. In a navigation instrument of the class described, the combination of an arcuate main support provided with an intermediate shank member, a stationary minute ring secured to said main support, a minute control assembly positioned on said stationary minute ring on the opposite side from said main support, a latitude and declination minute ring manually operable by said minute control assembly and an altitude arc pivotally connected in relation with said latitude and declination ring and an altitude arc indicator in cooperative relation with said altitude arc, and an altitude control assembly in cooperative relation with said arc for shifting the same longitudinally.

6. In a navigation instrument of the class described, the combination of an arcuate main support provided with an intermediate shank member, a stationary minute ring secured to said main support, a minute control assembly positioned on said stationary minute ring on the opposite side from said main support and a latitude and declination ring revolubly mounted in connection with said main support and said stationary minute ring manually operable by said minute control assembly, an altitude arc pivotally connected in relation with said latitude and declination ring, an altitude arc indicator in cooperative relation with said altitude arc, an altitude control assembly in cooperative relation with said arc for shifting the same longitudinally, and universally shiftable unit concentrically mounted in said latitude and declination ring and with said latitude arc.

7. In a navigation instrument of the class described, the combination of an arcuate main support provided with an intermediate shank member, a stationary minute ring secured to said main support, a minute control assembly positioned on said stationary minute ring on the opposite side from said main support and a latitude and declination ring revolubly mounted in connection with said main support and said stationary minute ring manually operable by said minute control assembly, an altitude arc pivotally connected in relation with said latitude and declination ring, an altitude arc indicator in cooperative relation with said altitude arc, an altitude control assembly in cooperative relation with said arc for shifting the same longitudinally, a universally shiftable unit concentrically mounted in said latitude and declination ring and with said altitude arc, and an hour angle degree dial revolubly mounted on said main support shank and cooperatively related with said universal operating unit.

8. In a navigation instrument of the class described, the combination of an arcuate main support provided with an intermediate shank member, a stationary minute ring secured to said main support, a minute control assembly positioned on said stationary minute ring on the opposite side from said main support and a latitude and declination ring revolubly mounted in connection with said main support and said stationary minute ring manually operable by said minute control assembly, an altitude arc pivotally connected in relation with said latitude and declination ring, an altitude arc indicator in cooperative relation with said altitude arc, an altitude control assembly in cooperative relation with said arc for shifting the same longitudinally, a universally shiftable unit concentrically mounted in said latitude and declination ring and with said altitude arc, an hour angle degree dial revolubly mounted on said main support shank and cooperatively related with said universal operating unit, and a minute control assembly mounted on said main support and shank and operatively connected with said hour angle degree dial.

9. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, and a universally shiftable control means concentric with said arcuate main support and in alignment with its shank and in operative relation with said hour angle degree dial.

10. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, and gear means connecting said hour angle degree dial with said universally operating control unit.

11. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, gear means connecting said hour angle degree dial with said universally operating control unit, and an altitude arc pivotally and shiftably mounted on an axis in alignment with said main support shank and said universally operated control and in revoluble operative relation with said universally operated control.

12. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, gear means connecting said hour angle degree dial with said universally operating control unit, an altitude arc pivotally and shiftably mounted on an axis in alignment with said main support shank and said universally operated control and in revoluble operative relation with said universally operated control, and a dial window bracket through which said altitude arc is shiftably mounted.

13. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, gear means connecting said hour angle degree dial with said universally operating control unit, an altitude arc pivotally and shiftably mounted on an axis in alignment with said main support shank and said universally operated control and in revoluble operative relation with said universally operated control, a dial window bracket through which said altitude arc is shiftably mounted and an altitude control assembly in cooperative relation with said dial window brackets and said altitude arc.

14. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, gear means connecting said hour angle degree dial with said universally operating control unit, an altitude arc pivotally and shiftably mounted on an axis in alignment with said main support shank and said universally operated control and in revoluble operative relation with said universally operated control, a dial window bracket through which said altitude arc is shiftably mounted, an altitude control assembly in cooperative relation with said dial window brackets and said altitude arc, and an altitude arc indicator in connection with said altitude arc.

15. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, gear means connecting said hour angle degree dial with said universally operating control unit, an altitude arc pivotally and shiftably mounted on an axis in alignment with said main support shank and said universally operated control and in revoluble operative relation with said universally operated control, a dial window bracket through which said altitude arc is shiftably mounted, an altitude control assembly in cooperative relation with said dial window brackets and said altitude arc, an altitude arc indicator in connection with sid altitude arc, and a latitude declination arc indicator in connection therewith.

16. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, gear means connecting said hour angle degree dial with said universally operating control unit, an altitude arc pivotally and shiftably mounted on an axis in alignment with said main support shank and said universally operated control and in revoluble operative relation with said universally operated control, a dial window bracket through which said altitude arc is shiftably mounted, an altitude control assembly in cooperative relation with said dial window brackets and said altitude arc, an altitude arc indicator in connection with said altitude arc, a latitude declination arc indicator in connection therewith, and a declination arc indicator ring in connection with said latitude declination arc indicator.

17. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, gear means connecting said hour angle degree dial with said universally operating control unit, an altitude arc pivotally and shiftably mounted on an axis in alignment with said main support shank and said universally operated control and in revoluble operative relation with said universally operated control, a dial window bracket through which said altitude arc is shiftably mounted, an altitude control assembly in cooperative relation with said dial window brackets and said altitude arc, an altitude arc indicator in connection with said altitude arc, a latitude declination arc indicator in connection therewith, a declination arc indicator ring in connection with said latitude declination arc indicator, and a stationary minute ring in which said latitude and declination ring is revolubly mounted.

18. In a navigation instrument of the class described, the combination of an arcuate main support provided with an intermediate shank portion, an hour angle degree dial revolubly mounted on said shank portion, a minute control assembly supported on said shank portion and operatively connected with said hour angle degree dial, a universally shiftable control means concentric with said arcuate main support and in alignment with its shank, gear means connecting said hour angle degree dial with said universally operating control unit, an altitude arc pivotally and shiftably mounted on an axis in alignment with said main support shank and said universally operated control and in revoluble operative relation with said universally operated control, a dial window bracket through which said altitude arc is shiftably mounted, an altitude control assembly in cooperative relation with said dial window brackets and said altitude arc, an altitude arc indicator in connection with said altitude arc, a latitude declination arc indicator in connection therewith, a declination arc indicator ring in connection with said latitude declination arc indicator, a stationary minute ring in which said latitude and declination ring is revolubly mounted, and a minute control assembly in cooperative relation with said stationary minute ring and said latitude and declination ring.

JOHN F. SMILLIE.